H. F. ROY.
CORN AND COTTON PLANTER.
APPLICATION FILED NOV. 7, 1910.

1,040,962.

Patented Oct. 8, 1912.

WITNESSES:

INVENTOR
Henry F. Roy.
BY
ATTORNEYS

UNITED STATES PATENT OFFICE.

HENRY F. ROY, OF ARLINGTON, TEXAS, ASSIGNOR OF ONE-THIRD TO WILLIAM P. CRAIG AND ONE-THIRD TO PROCTOR G. CRAIG, OF HANDLEY, TEXAS.

CORN AND COTTON PLANTER.

1,040,962.   Specification of Letters Patent.   Patented Oct. 8, 1912.

Application filed November 7, 1910. Serial No. 591,056.

*To all whom it may concern:*

Be it known that I, HENRY F. ROY, a citizen of the United States, residing at Arlington, in the county of Tarrant and State of Texas, have invented certain new and useful Improvements in Corn and Cotton Planters, of which the following is a specification.

My invention relates to new and useful improvements in corn and cotton planters, and has for its object the provision of a planter adapted to deposit the seed corn or cotton in equidistant hills, eliminating the necessity of chopping out to remove the superfluous plants.

A further object of the invention is to provide a device of the character described which will be strong, durable, simple and efficient and comparatively easy to construct, and also one, the various parts of which will not be likely to get out of working order.

Figure 1:
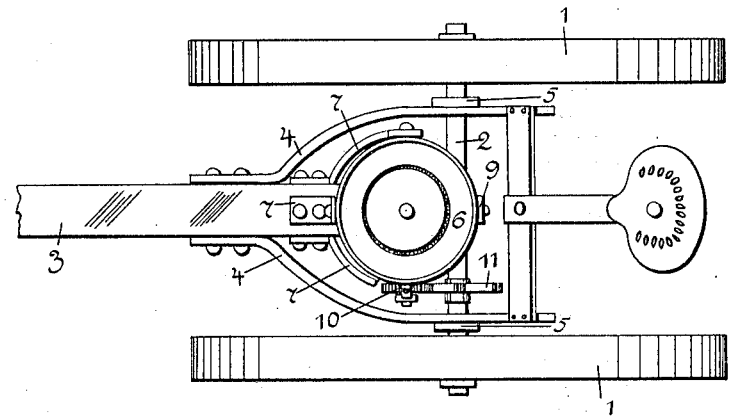
Figure 2:
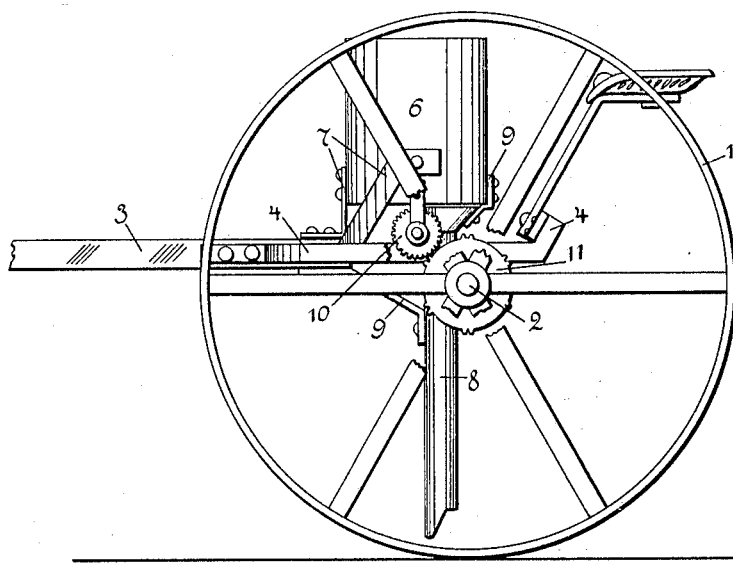

With these and various other objects in view, my invention has relation to certain novel features of construction and operation, an example of which is described in the following specification and illustrated in the accompanying drawing, wherein:

Figure 1 is a top view of the planter. Fig. 2 is a side elevation thereof with the spokes of the near wheel and a portion of the frame broken away to show the parts hidden thereby.

Referring now more particularly to the drawing wherein like numerals of reference designate similar parts in both the figures, the numeral 1 denotes the transporting wheels, and 2 the axle rigid therewith. The tongue 3 of the implement is provided at its rear portion with a pair of lateral brackets 4 extending outwardly and rearwardly. To each of these brackets is attached a bearing 5 mounted upon the axle. A seed hopper 6 is supported from the rear extremity of the tongue by a number of brackets 7, and a downwardly extending seed chute 8 is provided beneath the hopper and supported by brackets 9. A pinion 10 mounted upon a shaft passing through the hopper is adapted to communicate rotation to the agitator mechanism within the hopper not shown, which mechanism may be of any suitable description. An intermittent rotation is communicated to the pinion 10 by a mutilated gear 11 fast upon the axle. The teeth upon this gear are arranged in groups, between which are provided spaces which determine the distance between the seed hills. As each set of teeth upon the gear 11 act upon the pinion 10 the agitator in the seed hopper will operate discharging a few seed.

The above described device will not only accomplish a considerable saving in seed corn or cotton, but will save a great deal of labor by making it unnecessary to chop out the corn or cotton in order to space the seeds in the proper hills.

What I claim is:

A machine of the class described including a tongue, side members diverging therefrom, an axle mounted for rotation and supporting the side members, wheels supporting and adapted to rotate the axle, a seed box secured to the tongue, a seed chute depending from the box, a shaft extending through the bottom portion of the seed box and constituting means for actuating the dropping mechanism within the box, a gear upon said shaft, a mutilated gear secured to and revoluble with the axle and adapted to mesh intermittently with the gear on the shaft to rotate said shaft intermittently, and collars on the axle and engaging the side members for holding said axle against longitudinal movement and maintaining the mutilated gear in operative relation with the gear on the shaft.

In testimony whereof I have signed my name to this specification in the presence of two subscribing witnesses.

HENRY F. ROY.

Witnesses:
W. O. MIDDLETON,
BOSE READER.

Copies of this patent may be obtained for five cents each, by addressing the "Commissioner of Patents, Washington, D. C."